Nov. 15, 1949  H. L. BERNARDE  2,488,367
MOVABLE COIL WITH RECTIFIERS
FOR ELECTRICAL INSTRUMENTS
Filed July 9, 1946
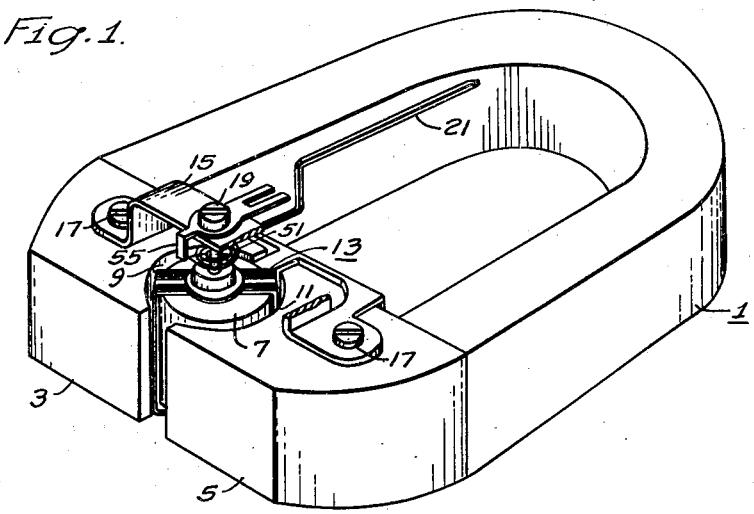
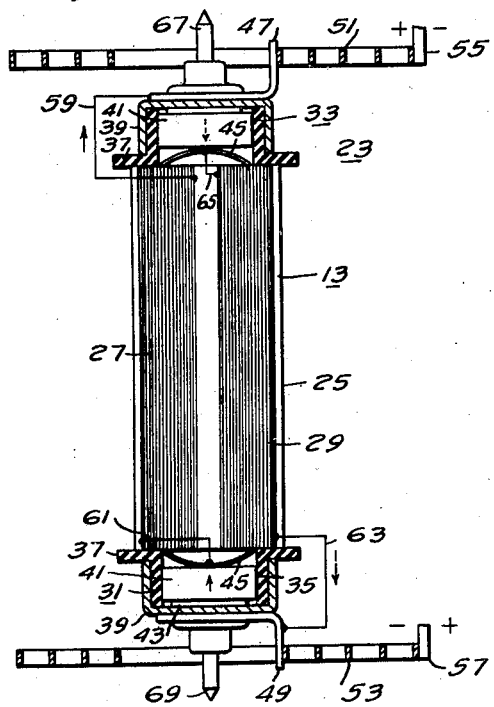
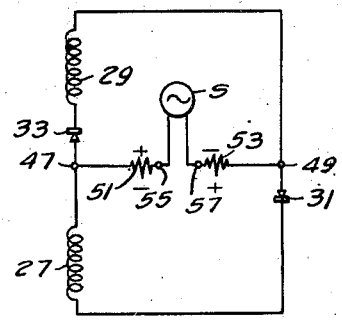
WITNESSES:
INVENTOR
Henry L. Bernarde.
BY
ATTORNEY

UNITED STATES PATENT OFFICE 2,488,367

MOVABLE COIL WITH RECTIFIERS FOR ELECTRICAL INSTRUMENTS

Henry L. Bernarde, Union, N. J., assignor to Westinghouse Electric Corporation, East Pittsburgh, Pa., a corporation of Pennsylvania Application July 9, 1946, Serial No. 682,187

6 Claims. (Cl. 171—95)

This invention relates to electrical devices and it has particular relation to permanent-magnet, moving coil instruments associated with rectifiers for the purpose of responding to alternating-current quantities.

Permanent-magnet, moving-coil instruments have long been employed for various purposes, such as for relaying and for measurement of alternating-current quantities. In one of the most generally employed circuits, a rectifier bridge has its output terminals connected to the coil of the instrument whereas the input terminals of the bridge are connected for energization in accordance with the desired alternating quantity. Unfortunately, such a bridge has substantial temperature errors for low values of voltages to be measured. Because of such errors, for some types of measuring instruments, such as decibel meters, a full scale value of approximately one volt is substantially the lowest value which can be employed in practice.

Alternatively, the instrument may have its coil connected in series with a half-wave rectifier and the source of the desired alternating quantity. Although such a connection decreases the temperature error for low-voltage values of the alternating quantity, it introduces an objectionable pulsating torque because of the half-wave rectification. In addition, the high-frequency range is limited for the reason that the inductance of the coil is reflected through the half-wave rectifier into the circuit.

The prior art also teaches the utilization of a permanent-magnet, moving-coil instrument having a coil provided with a central tap. The outer terminals of the coil are connected through coil springs and oppositely-poled half-wave rectifiers to one terminal of a source of an alternating quantity to be measured. The center tap is connected through a third spring to the remaining terminal of the source. The principal disadvantage of this embodiment is its requirement of three coil springs. The difficulties encountered in providing suitable coil springs for instruments are well known. Because of these difficulties, it is desirable to reduce the number of springs to a minimum.

In accordance with the invention, a permanent magnet moving coil instrument is provided with a rotor assembly which includes not only a coil assembly but rectifier means. Since the rectifier means are mounted on the rotor assembly, only two terminals or two coil springs are required for establishing connections between the coil assembly and a source of an alternating quantity to be measured. As a specific example, the coil assembly may include a first coil which is connected in series with a half-wave rectifier across the inner ends of a pair of spiral springs which constitute terminals therefor. The coil assembly includes a second coil which is connected in series with a second half-wave rectifier across the same springs. The rectifiers are oppositely poled in order to permit the flow of current in both directions between the springs. Consequently, if the outer ends of the springs are connected to a source of an alternating quantity to be measured, the instrument provides substantially full-wave rectification therefor.

It is, therefore, an object of the invention to provide an electrical instrument having a rotor assembly which includes both coil means and rectifier means.

It is a further object of the invention to provide in an electrical instrument a rotor assembly having terminals across which two coils are connected in parallel, each of the coils being energized from the terminals through a separate half-wave rectifier, the rectifiers being oppositely poled to permit the flow of current in both directions between the terminals.

It is also an object of the invention to provide a permanent-magnet, moving-coil device having two coils connected between a pair of spring terminals, each of the coils being connected between the springs through a separate half-wave rectifier, the rectifiers being oppositely poled to permit the flow of current between the springs in both directions.

Further objects of the invention will be apparent from the following description, taken in conjunction with the accompanying drawing, in which:

Figure 1 is a view in perspective with parts broken away of a permanent magnet moving coil instrument embodying the invention;

Fig. 2 is a view in side elevation with parts in cross section showing a coil assembly embodying the invention; and Fig. 3 is a schematic representation of a circuit suitable for the invention.

Referring to the drawing, Fig. 1 shows a permanent-magnet, moving-coil instrument comprising a permanent magnet 1 having magnetic pole pieces 3 and 5 associated therewith. The pole pieces are spaced to provide a cylindrical recess within which a cylindrical magnetic core 7 is disposed. The core 7 is spaced from the pole pieces 3 and 5 to define two arcuate air gaps 9 and 11 within which two sides of a coil assembly 13 are mounted for rotation. The magnet 1, pole pieces 3 and 5, and the core 7 form parts of a stator assembly.

In accordance with conventional practice, the coil assembly is mounted for rotation between two bearing brackets or bridges only one of which is shown in Fig. 1. As shown in Fig. 1, a bridge 15 may be secured to the pole pieces 3 and 5 by suitable machine screws 17. The bracket 15 has in threaded engagement therewith a bearing screw 19 for reception of a pivot associated with the coil assembly 13. A similar bridge may be provided for the opposite end of the coil assembly in accordance with conventional practice.

As previously pointed out permanent-magnet, moving coil instruments are employed in the industry for various purposes. The coil assembly of Fig. 1 may be employed for actuating relay contacts, for actuating a pen to produce a record of various measurements on a chart, or for actuating a pointer in a manner well understood in the art. In the specific embodiment of Fig. 1, a pointer 21 is associated with the coil assembly 13 for rotation therewith. As a general rule, the pointer 21 cooperates with a scale (not shown) for indicating the magnitude of a quantity to be measured by the instrument.

The coil assembly 13 forms a part of a rotor assembly 23 which is shown more particularly in Fig. 2. The rotor assembly includes a rectangular former 25 which may be constructed of an electro-conductive material, such as aluminum, in order to provide damping for the coil assembly in a manner well known in the art. This former has wound thereabout two electroconductive coils or coil portions 27 and 29 which constitute the coil assembly 13.

The rotor assembly 23 also has associated therewith two half-wave rectifiers. These rectifiers both may be disposed at one end of the rotor assembly or may be located in various positions as desired. However, in a preferred embodiment, one of the rectifiers 31 is disposed at the lower end of the rotor assembly whereas the second rectifier 33 is disposed at the upper end of the rotor assembly and both are in alignment with the axis of rotation of the rotor assembly.

Each of the rectifiers comprises a cup 35 which conveniently may be of an insulating material, such as a phenolic resin. This cup has a flange 37 in engagement with and secured to the coil assembly 13 and former 25. A cap 39 of electroconductive material, such as copper, is secured to the cup 31 as clearly shown in Fig. 2. A copper disk 41 having an oxide coating 43 thereon is positioned within the cup 35 with the oxide coating in engagement with the inner face of the cap 39. Consequently, the plate 41 and the cap 39, together with the oxide coating therebetween, form a copper-oxide rectifier. It should be understood, however, that other rectifiers, such as selenium rectifiers, may be employed, if desired. The various parts may be secured to each other by suitable adhesive means. A bronze spring 45 may be employed for urging the disk 41 towards the inner face of the cap 39 to maintain pressure on the oxide coating.

Rectifiers of the foresaid type are small and light in weight. For example, the disk 41 may have a diameter of 90 mils or less. Consequently, such rectifiers need not add unduly to the inertia of the coil assembly.

Inner terminals 47 and 49 are secured respectively to the caps 39 of the rectifiers 33 and 31. These inner terminals are of electroconductive material, such as copper, and are conductively secured to the associated caps. The inner terminals 47 and 49 also serve as inner abutments for two spiral springs 51 and 53. The outer ends of the spiral springs are connected to outer terminals 55 and 57. It will be understood that when a source of alternating current is connected between the outer terminals 55 and 57, the source is conductively connected through the springs and coils to the rectifiers 33 and 31.

In accordance with established practice the spiral springs may be employed not only for conducting current to the coil assembly but for biasing the rotor assembly towards a predetermined position. The terminal 55 may be made adjustable about the axis of rotation of the rotor assembly for adjusting the bias exerted by the associated spring as shown in Fig. 1.

One terminal of the coil 27 is connected through a conductor 59 to the inner terminal 47. The remaining terminal of the coil 27 is connected through a conductor 61 to the spring 45 of the rectifier 31. In a somewhat similar manner, one terminal of the coil 29 is connected through a conductor 63 to the inner terminal 49 and the remaining end of the coil 29 is connected through a conductor 65 to the spring 45 associated with the rectifier 33. These connections are such that the coil 27 and the rectifier 31 are connected in series between the inner terminals 47 and 49. Also, the coil 29 and the rectifier 33 are connected in series between the same inner terminals.

The connections are shown in schematic form in Fig. 3. It will be noted that a source S of an alternating quantity to be measured may be connected to the outer terminals 55 and 57. When the terminal 55 is positive, current flows through the coil 29. When this terminal is negative, current flows through the coil 27. Consequently, the coils and rectifiers provide, in effect, full-wave rectification. At the same time, only two spiral springs are required.

It will be noted also in Fig. 2 that two pivots 67 and 69 are secured to the opposite ends of the rotor assembly. These pivots cooperate with the aforementioned bearing screws to mount the rotor assembly for rotation relative to a stator assembly which includes the permanent magnet 1, the pole pieces 3 and 5 and the core 7.

In the specific embodiment herein described, the coils 27 and 29 are so wound and connected that the torques produced by currents flowing through the coils and rectifiers are additive.

Although the invention has been described with reference to a certain specific embodiment thereof, numerous modifications thereof are possible.

I claim as my invention:

1. In a moving-coil electrical instrument, a rotor assembly comprising a pair of terminals, a pair of coils, a pair of rectifier means, and means connecting each of the coils for energization from said terminals through a separate one of the rectifier means, a stator assembly, and means mounting the rotor assembly for rotation relative to the stator assembly, said stator assembly comprising means for establishing a magnetic field for the coils.

2. In a moving-coil electrical instrument, a rotor assembly comprising a pair of terminals, a pair of coils, a pair of half-wave rectifier means, and means connecting each of the coils for energization from said terminals through a separate one of the rectifier means, said rectifier means being connected to permit flow of current in opposite directions between said terminals, a stator assembly, and means mounting the rotor assembly for rotation relative to the stator assembly, said stator assembly comprising means for establishing a magnetic field for the coils.

3. In a moving-coil electrical instrument, a rotor assembly comprising a pair of aligned, spaced bearing elements, coil means interposed between the bearing elements, a pair of rectifier means aligned with the bearing elements, and means connecting a separate portion of said coil means for energization in accordance with current passing through each of the rectifier means, a stator assembly, and means cooperating with the bearing elements to permit rotation of the rotor assembly relative to the stator assembly, said stator assembly comprising means for establishing a magnetic field for the coil means.

4. In a moving-coil electrical instrument, a stator assembly, a rotor assembly; means mounting said rotor assembly for rotation relative to said stator assembly; said rotor assembly comprising a first coil, a first unidirectional rectifier, means connecting said coil and said rectifier electrically in series to form a first circuit arm, a second coil, a second unidirectional rectifier, and means connecting said second coil and said second unidirectional rectifier in series to form a second circuit arm; a pair of spaced electroconductive springs for establishing circuit connections between said rotor and stator assemblies; and means connecting said circuit arms in parallel between said springs, said rectifiers being connected to permit flow of current between said springs in opposite directions, whereby current flows between said springs in a first direction through said first circuit arm, and whereby current flows between said springs in a second direction through said second circuit arm, said stator assembly comprising means for establishing a magnetic field for the coils.

5. In a permanent-magnet, moving-coil instrument, a magnetic structure having an air gap, said magnetic structure including a permanent magnet for directing magnetic flux through said air gap, a pair of coils, means mounting said coils in said air gap for rotation relative to said magnetic structure, a pair of unidirectional rectifiers mounted for rotation with said coils relative to said magnetic structure, a pair of terminals, and means establishing a parallel circuit between said terminals having two arms each including a separate one of said rectifiers and a separate one of said coils wherein said rectifiers are poled to permit current to flow in opposite directions between said terminals.

6. A rotor assembly for a moving-coil instrument comprising a pair of spaced yieldable, electroconductive terminal elements each having relatively movable ends, a pair of coils, a pair of rectifier means, and means connecting each of the coils for energization from common ends of the terminal elements through a separate one of the rectifier means, said rectifier means being connected to permit flow of current in opposite directions between the terminal elements, whereby the coils and rectifier means may be mounted for rotation as a unit relative to a stator structure.

HENRY L. BERNARDE.

REFERENCES CITED

The following references are of record in the file of this patent:

UNITED STATES PATENTS

| Number | Name | Date |
|---|---|---|
| 1,610,566 | MacGahan | Dec. 14, 1926 |
| 2,427,100 | Kihn | Sept. 9, 1947 |